United States Patent
Hori et al.

(10) Patent No.: US 8,425,114 B2
(45) Date of Patent: Apr. 23, 2013

(54) TEMPERATURE SENSOR

(75) Inventors: Tsunenobu Hori, Kariya (JP); Nobuo Abe, Yokkaichi (JP); Masatoshi Kuroyanagi, Kariya (JP)

(73) Assignee: Denso Corporation, Kariya, Aichi-Pref. (JP)

( * ) Notice: Subject to any disclaimer, the term of this patent is extended or adjusted under 35 U.S.C. 154(b) by 674 days.

(21) Appl. No.: 12/596,282

(22) PCT Filed: Apr. 16, 2008

(86) PCT No.: PCT/JP2008/057405
§ 371 (c)(1), (2), (4) Date: Mar. 17, 2010

(87) PCT Pub. No.: WO2008/133135
PCT Pub. Date: Nov. 6, 2008

(65) Prior Publication Data
US 2010/0183046 A1  Jul. 22, 2010

(30) Foreign Application Priority Data

Apr. 16, 2007 (JP) .................................. 2007-107517
Apr. 11, 2008 (JP) .................................. 2008-103995

(51) Int. Cl.
*G01K 7/22* (2006.01)
*G01K 7/00* (2006.01)

(52) U.S. Cl.
USPC .......................................... 374/185; 374/163

(58) Field of Classification Search .................. 374/185, 374/148, 163
See application file for complete search history.

(56) References Cited

U.S. PATENT DOCUMENTS 6,286,995 B1   9/2001   Takahashi et al.
6,639,505 B2 *  10/2003  Murata et al. .................. 374/185
(Continued)

FOREIGN PATENT DOCUMENTS

JP      5-79922      3/1993
JP    2000-162051    6/2000
(Continued)

OTHER PUBLICATIONS

Chinese Office Action dated Nov. 10, 2010, issued in corresponding Chinese Application No. 200880012310.8 with English translation.

(Continued)

*Primary Examiner* — Yaritza Guadalupe-McCall
(74) *Attorney, Agent, or Firm* — Nixon & Vanderhye PC

(57) ABSTRACT

A temperature sensor including a temperature sensitive device which is disposed in a flow path through which fluid flows and whose electric characteristic changes as a function of temperature of the fluid in the flow path, signal lines connected at top end sides thereof to said temperature sensitive device through electrode wires and at base end sides thereof to lead wires for connection with an external circuit, a sheath member retaining the signal lines therein, and a holding member which holds an outer circumferential surface of said sheath member directly or indirectly through another member. The resonance (primary) frequency at a top end of the temperature sensor against acceleration in a radius direction of the temperature sensor is 480 Hz or less, thereby reducing the transmission of vibration to the top end of the temperature sensor to avoid the breakage of the temperature sensitive device and the disconnection of the electrode wires 502102 even when the temperature sensor resonates.

9 Claims, 9 Drawing Sheets

U.S. PATENT DOCUMENTS

| | | | |
|---|---|---|---|
| 2002/0135455 A1* | 9/2002 | Murata et al. | 338/28 |
| 2006/0176931 A1 | 8/2006 | Miyahara et al. | |
| 2010/0183046 A1* | 7/2010 | Hori et al. | 374/185 |
| 2010/0195698 A1* | 8/2010 | Hori | 374/148 |

FOREIGN PATENT DOCUMENTS

| | | |
|---|---|---|
| JP | 2002-350239 | 12/2002 |
| JP | 2004-157052 | 6/2004 |
| JP | 2004-177182 | 6/2004 |
| JP | 2004-354400 | 12/2004 |
| JP | 2006-47273 | 2/2006 |
| JP | 2006-126067 | 5/2006 |
| JP | 2008-281548 | 11/2008 |
| JP | 2008-286790 | 11/2008 |
| WO | WO 2008/093766 | 8/2008 |
| WO | WO 2008/133134 | 11/2008 |

OTHER PUBLICATIONS

Information Offer Form dated Oct. 26, 2010, issued in corresponding JP Application No. 2008-103995, with English translation.

Written Opinion for PCT/JP2008/057405, dated Nov. 19, 2009, 4 pages.

International Search Report for PCT/JP2008/057405, mailed Jul. 22, 2008.

* cited by examiner

× : breakage of electrode wires 102 within target time (equivalent to 300,000km)
○ : breakage of electrode wires 102 after lapse of one or two times the target time
◎ : no breakage of electrode wires 102 even after elapse of two times the target time or more.

TEMPERATURE SENSOR

This application is the U.S. national phase of International Application No. PCT/JP2008/057405 filed 16 Apr. 2008, which designated the U.S. and claims priority to Japan Application Nos. 2007-107517 filed 16 Apr. 2007 and 2008-103995 filed 11 Apr. 2008, the entire contents of each of which are hereby incorporated by reference.

TECHNICAL FIELD

The present invention relates generally to a temperature sensor to be installed in an exhaust system of internal combustion engines.

BACKGROUND ART

There are known so-called exhaust temperature sensors which measure the temperature of exhaust gas flowing through a path such as the inside of a catalytic converter or an exhaust pipe of automobile exhaust emission control device using a thermo-sensitive device.

A thermistor whose electric characteristics are sensitive to temperature is disposed inside a bottomed cylindrical metallic cover. In order to enhance the thermally sensitive response of the thermistor surrounded by the metallic cover, an insulating material which is good at thermal conductivity is disposed in a space formed between an inner circumferential surface of the metallic cover and an end surface of a sheath pin so that after received by the metallic cover, the heat of exhaust gas is transmitted to the thermistor through the insulating material. An electric signal produced by the thermistor whose electric characteristics are sensitive to temperature is transmitted through electrode wires to a control device in which the temperature is to be measured.

Such a temperature sensor is disclosed in patent documents 1 and 2. The temperature sensor, as illustrated in FIG. 9, includes a thermistor 501 serving as a temperature sensitive device, a sheath pin 505 having disposed therein signal lines 503 welded to a pair of electrode wires 502 joined to the thermistor 501, a temperature sensitive portion cover 504 that is a metallic cover disposed on a top end of the thermistor 501 to cover it, and a rib 601 retaining the sheath pin 505 at an outer circumference thereof. The installation of the temperature sensor in an exhaust pipe 800 is achieved by placing a holding member 602 and a nipple 701 on an outer circumference of the rib 601 and securing the nipple 701 to a boss 704 mounted in the exhaust pipe 800.

An internal combustion engine in connection with the exhaust pipe in which the temperature sensor is typically mounted usually vibrates during running thereof. Such vibration is transmitted from the exhaust pipe 800 to the sheath pin 505 of the temperature sensor through the boss 704 and the rib 601. Specifically, the rib 601 and the sheath pin 505 are welded together, so that the vibration is transmitted from the rib 601 directly to the sheath pin 505.

Consequently, the vibration of the sheath pin 505 becomes strong (high frequency and great amplitude), which may cause the temperature sensitive portion to vibrate at high acceleration.

An excessive stress may, thus be exerted on the top end of the sheath pin 505, the thermistor 505 disposed on the top of the sheath pin 505, or a welded portion between the sheath pin 505 and the rib 601.

The excessive stress on the thermistor 501 may result in breakage of the thermistor 501 or disconnection of the electrode wire 502 of the thermistor 505. The excessive stress on the weld between the sheath pin 505 and the rib 601 may result in cracks or breakage of the sheath pin 505.

Therefore, in FIG. 9, the length L4 between the top end of the sheath pin 505 held by the rib 601 and the top end of the temperature sensor is shortened greatly relative to the length L3 between the inner circumferential surface of the exhaust pipe 800 in which the temperature sensor is installed and the top end of the temperature sensor. This causes the resonance frequency of the top end of the temperature sensor to lie out of a resonance frequency band of the vibration of the exhaust pipe in which the temperature sensor is installed, thereby avoiding the disconnection of the signal lines 502, etc.

Patent Document 1: Japanese Patent First Publication No. 2002-350239

Patent Document 2: Japanese Patent First Publication No. 2006-47273

The structure of Patent document 1 or 2, however, face the problem that it is impossible to bring the resonance frequency of the top end of the temperature sensor out of the resonance frequency band of the vibration of the exhaust pipe, thus resulting in possibility of the breakage of the thermistor 501 or the disconnection of electrode wires 502.

When the rib 601 is prolonged toward the top end to increase the resonance (primary) frequency of the sheath pin 505, it will cause the resonance to be about 500 times, so that the stress acting on the electrode wires 502 located on the top end side of the temperature sensor to be increased greatly. This results in a difficulty in avoiding disconnection of electrode wires 502.

The present invention was made in order to solve the prior art problems. It is an object to provide a temperature sensor which reduces the transmission of vibration and is excellent in durability.

In order to achieve the above object, is a temperature sensor including a temperature sensitive device which is disposed in a flow path through which fluid flows and whose electric characteristic changes as a function of temperature of the fluid in the flow path, signal lines connected at top end sides thereof to said temperature sensitive device through electrode wires and at base end sides thereof to lead wires for connection with an external circuit, a sheath member retaining the signal lines therein, and a holding member which holds an outer circumferential surface of said sheath member directly or indirectly through another member, characterized in that a resonance (primary) frequency at a top end of the temperature sensor against acceleration in a radius direction of the temperature sensor is 480 Hz or less.

There was a conventional technical idea of increasing the resonance (primary) frequency at the top end of the temperature sensor to avoid the resonance arising from external vibration. However, the present invention was based on a technical idea opposite the conventional one. Specifically, the decrease in transmission of vibration to the top end of the temperature sensor is achieved by decreasing the resonance (primary) frequency at the top end of the temperature sensor down to 480 Hz or less, thereby avoiding the breakage of the thermistor 501 or disconnection of the electrode wires 502 even when the temperature sensor resonates.

The resonance (primary) frequency may also be 380 Hz or less against the acceleration in the radius direction of the temperature sensor.

This ensures the durability further and avoids the disconnection of the electrode wires for an increased period of time.

If a protruding length that is a distance between an inner circumference of said flow path and a top end of the temperature sensor on an axis of the temperature sensor is defined as L1, and a held length that is a distance between a top end of a portion of said sheath member which is held by the holding member directly or indirectly and the top end of the temperature sensor is defined as L2, then a relation of L1<L2 is preferably satisfied.

The protruding length L1 is changed frequently according to the object or intended purpose. For instance, the protruding length L1 is changed greatly between when the temperature of a central portion of the flow path is to be measured and when the temperature of an inner edge of the flow path is to be measured. Consequently, when L1<L2, the resonance (primary) frequency at the top end of the temperature sensor depends upon the protruding length L1 as long as a condition such as the diameter of the sheath member is constant. In other words, when the protruding length L1 is short, it will result in an increase in the held length L2, so that the resonance (primary) frequency at the top end of the temperature sensor will become great.

However, in the present exemplary embodiment, the held portion of the sheath member is designed to be located at the base end of the holding member, thereby permitting the held length L2 to be increased sufficiently even when the protruding length L1 is short, which results in a great decrease in resonance (primary) frequency at the top end of the temperature sensor regardless of the protruding length L1.

The breakage of the electrode wires and the temperature sensitive device located at the top end side of the temperature sensor caused by the resonance is, therefore, avoided.

If a diameter of a portion of the protruding length L1 which holds said temperature sensitive device is defined as a sensor outer diameter D, the sensor outer diameter D is 3.2 mm or less, and preferably the held length L2 is 75 mm or more.

This enables the resonance (primary) frequency at the top end of the temperature sensor to be decreased below 480 Hz as the sensor outer diameter D is decreased and the held length L2 is increased, thereby avoiding the disconnection of the electrode wires.

Preferably, the temperature sensitive device is disposed inside a metallic cover.

This shields the temperature sensitive device from the atmosphere of exhaust gas to avoid the reduction-caused deterioration of the temperature sensitive device.

Preferably, the temperature sensitive device is implemented by a thermistor.

This realizes the temperature sensor which is high in measurement accuracy.

Preferably, temperature sensitive device is embedded in a fixing member supplied inside a top end of said metallic cover.

This avoids collision of the temperature sensitive device with the metallic cover so that it is broken when the temperature sensor vibrates following external vibration. Further, the temperature sensitive device is secured by the fixing member inside the metallic cover, thus reducing the vibration of the temperature sensitive device caused by the resonance. This decreases the stress acting on the electrode wires which is developed by the resonance of the temperature sensitive device.

Preferably, the temperature sensitive device is sealed by glass.

In high-temperature environments, the metallic cover is oxidized, so that the concentration of oxygen within the metallic cover drops. It is, thus, necessary to avoid the reduction-caused deterioration arising from removal of oxygen from the temperature sensitive device. The reduction-caused deterioration of the temperature sensitive device is, therefore, avoided by sealing the temperature sensitive device using the glass. This ensures the stability in the measurement accuracy of the temperature sensitive device.

DESCRIPTION OF REFERENCE NUMBERS

| | |
|---|---|
| 1 | exhaust temperature sensor (temperature sensor) |
| 10 | temperature sensitive portion |
| 20 | case |
| 101 | thermistor (temperature sensitive device) |
| 102 | electrode wire |
| 103 | signal lines (signal lines) |
| 104 | temperature sensitive portion cover (metallic cover) |
| 105 | sheath pin (sheath member) |
| 106 | fixing member |
| 107 | glass material |
| 201 | rib (holding member) |
| 202 | protection tube (holding member) |
| 203 | lead wire |
| 204 | holder tube |
| 310 | nipple |
| 302 | fixing member |
| 303 | electric furnace |
| 304 | boss |
| 400 | exhaust pipe (flow path) |

DETAILED DESCRIPTION OF EXEMPLARY EMBODIMENTS

Embodiments of an exhaust temperature sensor 1 (temperature sensor) according to the invention will be described below based on drawings.

The exhaust temperature sensor 1 is applied as a sensor to measure the temperature of exhaust gas emitted from an automotive engine and to be installed in, for example, an exhaust pipe of automobiles.

Figure 1:
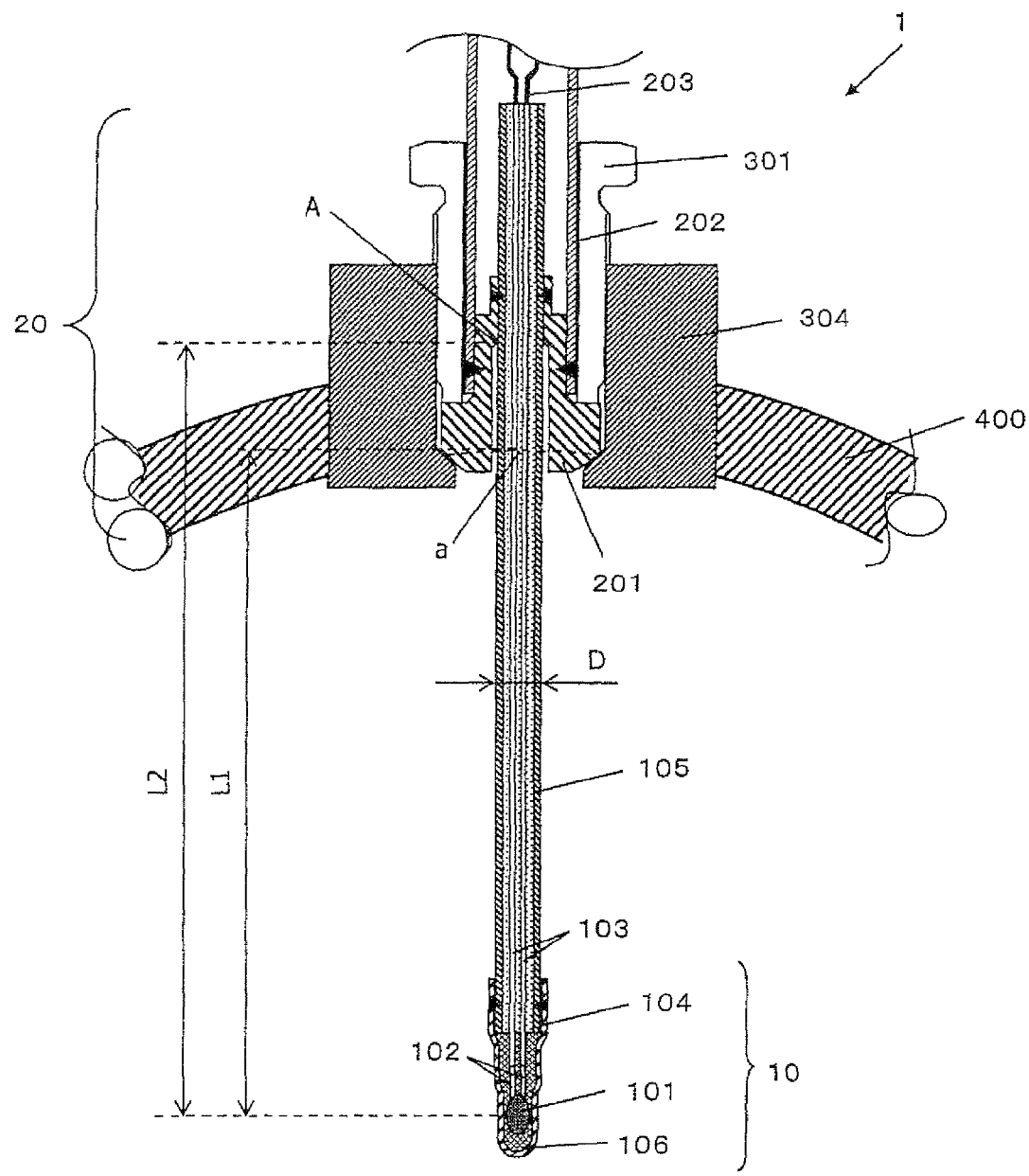
FIG. 1 is a cross sectional view which shows an exhaust temperature sensor 1 of the invention installed in a flow path.

As illustrated in FIG. 1, the exhaust temperature sensor 1 consists essentially of a temperature sensitive portion 10, a case 20, and a sheath pin 105 disposed between the temperature sensitive portion 10 and the case 20.

In this specification, the lower side and the upper side of FIG. 1 will be referred to below as a top end side and a base end side, respectively, in explanation of the structure of the exhaust temperature sensor 1.

The temperature sensitive portion 10 is exposed to the exhaust gas and sensitive to the temperature of the exhaust gas.

Figure 2:
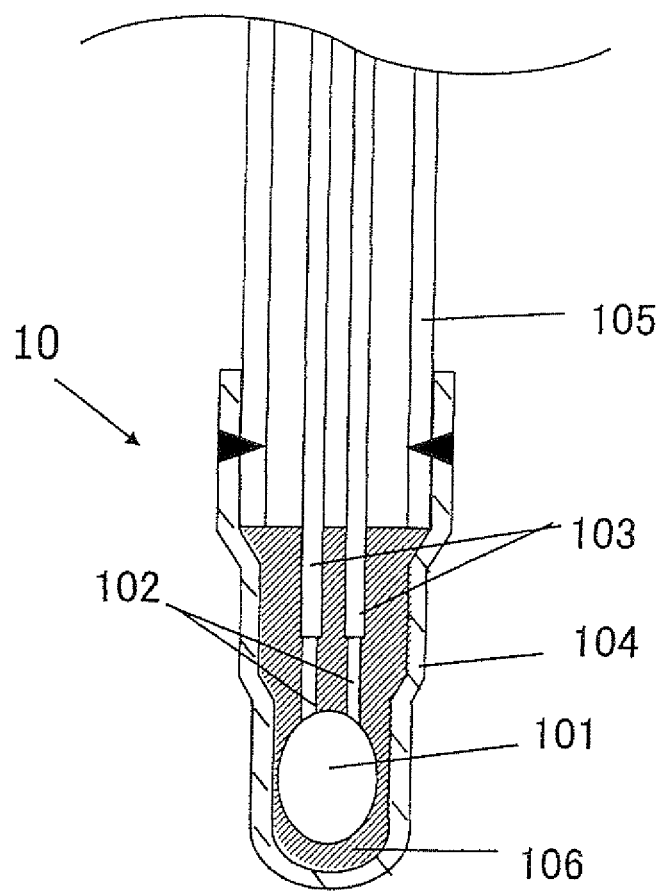
FIG. 2 is an enlarged sectional view showing a temperature sensitive portion 10 in FIG. 1.

FIG. 2 is an enlarged sectional view which shows the temperature sensitive portion 10 of FIG. 1 which is formed by a sintered body made of semiconductor material whose main component is Cr-Mn and includes a thermistor 101 that is a temperature sensitive device sensitive to the temperature of exhaust gas, a pair of electrode wires 102 which transmits an electric signal, as produced by the thermistor 101 to the base end side, a pair of signal lines 103 whose top end is joined at the base end side of the electrode wires 102 through laser welding or resistor welding and other end is connected to lead wires 203, and a temperature sensitive portion cover 104 that is a metallic cover to protect the thermistor 101. The signal lines and the electrode wires 102 are made of platinum material. The signal lines 103 are made of stainless steel. The temperature sensitive portion cover 104 is made of Inconel material shaped by the deep drawing into a bottomed cylinder.

The thermistor 101 is preferably used as the temperature sensitive device to easily make the exhaust temperature sensor which has high measurement accuracy.

The thermistor 101 is preferably disposed inside temperature sensitive portion cover 104 to shield thermistor 101 from exhaust gas, thereby avoiding deterioration of thermistor thermistor 101.

A fixing member is preferably disposed between thermistor 101 and temperature sensitive portion cover 104 to avoid collision of thermistor 101 with temperature sensitive portion cover 104 when the exhaust temperature sensor vibrates, so that thermistor 101 oscillates. This avoids damage to thermistor 101 and disconnection of electrode lines 102 of thermistor 101.

As the fixing material, material which is excellent in thermal conductivity may be used to accelerate the transmission of heat outside the temperature sensitive portion cover 104 to thermistor 101, thereby achieving the exhaust temperature sensor which is excellent in response.

Further, temperature sensitive portion cover 104 preferably uses alloy such as Inconel that is excellent in oxidation resistance, thereby avoiding oxidation of temperature sensitive portion cover 104 and avoiding a change in characteristic of thermistor 101 arising from a decrease in concentration of oxygen in temperature sensitive portion cover 104. The oxidation of temperature sensitive cover 104 usually results in a drop in concentration of oxygen in the cover. This may cause the oxygen to be removed from the thermistor 101 to compensate for the drop in concentration of oxygen, thereby changing the characteristics of thermistor 101. This is avoided by making temperature sensitive portion cover 101 by the anti-oxidation metal.

As the anti-oxidation metal, there is, for example, stainless steel or Inconel

In the thus constructed temperature sensitive portion 10, the sheath pin 105 which corresponds to a sheath member is inserted and disposed at an end thereof.

The sheath pin 105 is cylindrical and made of Inconel. The sheath pin 105 is secured to the temperature sensitive portion cover 104 by crimping or laser-welding. The sheath pin 105 may be press-fitted or resistor-welded into the temperature sensitive portion cover 104.

Thermistor 101 is preferably sealed by a glass material. This reduces the deterioration of the temperature sensitive device and makes it excellent in durability.

The sheath pin 105 has signal lines 103 disposed therein and insulates and protects them. The sheath pin 105 includes the two signal lines 103 made of stainless steel, an insulating portion made of insulating powder such as magnesia which is disposed around signal lines 103, and an outer tube portion made of stainless steel covering the outer circumference of the insulating portion.

Next, the case 20, as illustrated in FIG. 1, will be described below. The case 20 serves to install the exhaust temperature sensor 1 to the exhaust pipe and is joined to the temperature sensitive portion 10 through the sheath pin 105 corresponding to the sheath member.

The case 20 includes a rib 201 coupled to the outer periphery of the sheath pin 105, a protection tube 202 welded to the outer periphery of the rib 201, and the lead wires 203 connected electrically to the base end of the sheath pin 105.

In FIG. 1, a substantially integrated member formed by securing the rib 201 and the protection tube 202 together through laser-welding corresponds to the holding member.

As illustrated in FIG. 1, a boss 301 is fixed in exhaust pipe 400 which corresponds to the flow path. The boss 301 has an internal thread formed on an inner circumferential surface thereof. The installation of the exhaust temperature sensor 1 in exhaust pipe 400 is achieved by pressing it to the top end side in contact of nipple 202 with the base end surface of rib 201 and, at the same time, engaging an external thread of nipple 202 with the internal thread of boss 301.

The top end surface of the rib 201 is seated firmly on the inner peripheral surface of the boss 301 to hermetically seal the exhaust gas flowing inside the exhaust pipe 400.

The thus constructed exhaust temperature sensor 1 outputs an exhaust gas temperature signal, as produced by the thermistor 101, to an external circuit (e.g., an ECU) not shown through the lead wires 203 to detect the temperature of the exhaust gas.

The fixing of the rib 201 and the protection tube 202 is achieved by placing a portion of the outer circumferential surface of the rib 201 in abutment with the inner circumferential surface of the protection tube 202 and welding the outer circumferential surface of the protection tube 202.

The sheath pin 105 is fit in a central hole of the rib 201. The sheath pin 105 and the rib 201 are welded together at a contact between the inner circumferential surface of the rib 201 and the outer circumferential surface of the sheath pin 105.

The holding member, as referred to in this specification, is the substantially integrated member made by laser-welding the rib 201 and the protection tube 202. A held portion of the sheath member is a contact between the sheath member and the rib 201 disposed around the outer periphery of the sheath pin 105.

The features of the exhaust temperature sensor 1 according to the embodiment of the invention will be described below.

The fixing of the rib 201 and the protection tube 202 is, as illustrated in FIG. 1, achieved by placing the portion of the outer circumferential surface of the rib 201 in contacting abutment with the inner circumferential surface of the protection tube 202 and welding the outer circumferential surface of the protection tube 202.

The sheath pin 105 is fit in the central hole of the rib 201. The sheath pin 105 and the rib 201 are welded together at the contact between the inner circumferential surface of the rib 201 and the outer circumferential surface of the sheath pin 105.

The vibration applied externally to the exhaust temperature sensor 1 is transmitted to the contact (i.e., the held portion) between the inner circumferential surface of the rib 201 and the outer circumferential surface of the sheath pin 105 to induce the vibration and the resonance to which the sheath pin 105 has the contact as a fixed end is subjected. The resonance, as referred to herein, is the characteristic vibration of each member such as the sheath pin 105 having energy which arises from vibration applied thereto.

In this embodiment, the resonance (primary) frequency at the top end of the exhaust temperature sensor 1 is specified to be 480 Hz relative to acceleration of exhaust temperature sensor 1 in a radius direction thereof.

The reduction in transmission of vibration to the top end of exhaust temperature sensor 1 may be achieved by bringing the above resonance frequency below 480 Hz. Even when the resonance occurs at exhaust temperature sensor 1, it avoids breakage of thermistor 501 or disconnection of electrode wires 502. The resonance frequency is preferably set to 380 Hz or less, thereby enabling exhaust temperature sensor 1 which has a high degree of durability and vibration resistance. The vibration resistance is ensured, especially when exhaust temperature sensor 1 is used in an exhaust system which is designed to vibrate greatly or required to be prolonged.

Note that the resonance (primary) frequency at the top end of the exhaust temperature sensor 1 may be measured using a laser Doppler oscillometer.

The adjustment of the resonance (primary) frequency at the top end of the exhaust temperature sensor 1 may be achieved by selecting a relation between a protruding length L1 and a held length L2 where the protruding length L1 is, as can be seen in FIG. 1, a distance between the inner circumferential surface of the exhaust pipe 400 on the axis of the exhaust temperature sensor 1 and the top end of the exhaust temperature sensor 1, and the held length L2 is a distance between the top end of the held portion where the sheath pin 105 is held or retained directly or indirectly by the rib 201 that is the holding member and the top end of the exhaust temperature sensor 1.

The inner circumference surface of exhaust pipe 400 on the axis of exhaust temperature sensor 1, as referred to above, is an intersection a between an imaginary line (a broken line in FIG. 1) extending through opposed ends of exhaust pipe 400 in which exhaust temperature sensor 1 is installed and the axis of exhaust temperature sensor 400. The protruding length L1 is a distance between the intersection a and the top end of exhaust temperature sensor 1.

The top end of the held portion, as referred to above, is an end A of the held portion in which the rib 201 and the sheath pin 105 are welded, that is, portions of the rib 201 and the sheath pin 105 which are placed in constant contacting abutment with each other. In this embodiment, the protruding length L1 is also a distance between an end of a tapered portion of the rib 201 o the base end side and the top end of the temperature sensitive portion 10 (i.e., a length of a portion of the exhaust temperature sensor 1 protruding into the exhaust pipe 400).

In this embodiment, the protruding length L1 and the held length L2 preferably have a relation of L1<L2.

The resonance frequency at the top end of the exhaust temperature sensor 1 may be decreased by prolonging the held length L2 as much as possible relative to the protruding length L1, thereby avoiding the disconnection of the electrode wires 102.

Figure 3:
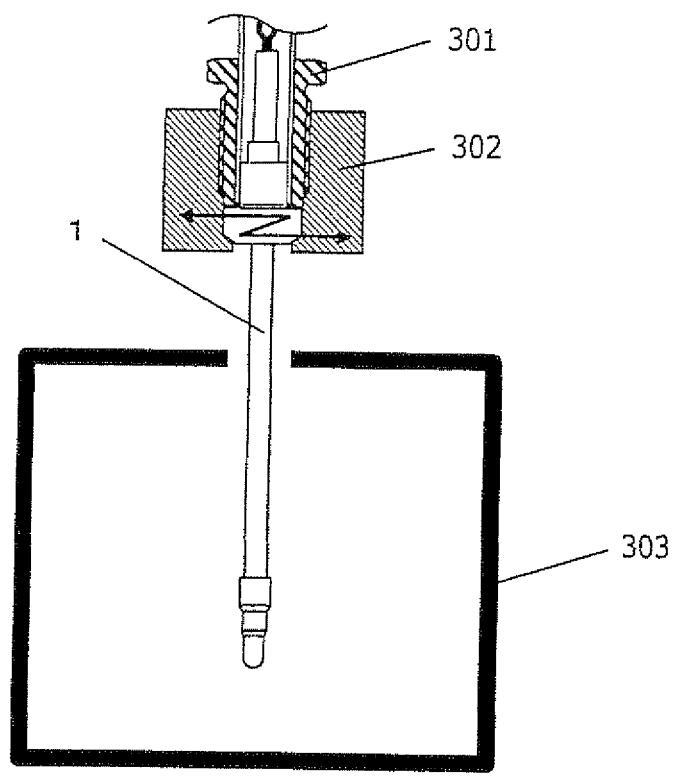
FIG. 3 is a schematic view which illustrates a heat/resonance durability test on an exhaust temperature sensor.

The relation among the resonance frequency of exhaust temperature sensor 1, protruding length L1, and held length L2 was checked by heat/resonance durability tests, as illustrated in FIG. 3.

As illustrated in FIG. 3, the heat/resonance durability tests are to apply acceleration to the exhaust temperature sensor 1 in a radius direction thereof while the top end of the exhaust temperature sensor 1 is being heated in an electric furnace 303. Test conditions are to place the top end of the exhaust temperature sensor 1 in the furnace 303 to bring the temperature of the top end up to 850° C., apply an acceleration of 20G to a mount 302 in which the exhaust temperature sensor 1 is installed through the nipple 301, and at the same time sweep a frequency band near the (primary) resonance frequency of each sample (i.e., the top end of the sheath pin 105) to observe the presence of breakage of the electrode wires 102.

The tests were performed for different values, as listed in table 1, of a sensor outer diameter D that is a diameter of the sheath pin 105 which is the holding member holding the thermister 101 within the protruding length L1 and the held length L2. Results of the tests are shown in table 1 and FIG. 4.

Note that the resonance was measured by the above described laser Doppler oscillometer. In the tests, the protruding length L1 was smaller than the held length L1 by 20 mm (L1=L2−20).

TABLE 1

* L1 = L2 − 20

| Sample No. | Sheath pin outer dia. D (mm) | L1 (mm) | L2 (mm) | Resonance frequency (Hz) | Judgment |
|---|---|---|---|---|---|
| 1 | 2.3 | 30 | 50 | 808 | X |
| 2 |  | 40 | 60 | 561 | X |
| 3 |  | 45 | 65 | 478 | ◯ |
| 4 |  | 50 | 70 | 412 | ◯ |
| 5 |  | 55 | 75 | 359 | ⊚ |
| 6 |  | 60 | 80 | 316 | ⊚ |
| 7 |  | 65 | 85 | 280 | ⊚ |
| 8 |  | 70 | 90 | 249 | ⊚ |
| 9 | 2.9 | 30 | 50 | 980 | X |
| 10 |  | 40 | 60 | 680 | X |
| 11 |  | 45 | 65 | 580 | X |
| 12 |  | 50 | 70 | 500 | X |
| 13 |  | 55 | 75 | 435 | ◯ |
| 14 |  | 60 | 80 | 383 | ⊚ |
| 15 |  | 65 | 85 | 339 | ⊚ |
| 16 |  | 70 | 90 | 302 | ⊚ |
| 17 | 3.2 | 30 | 50 | 1066 | X |
| 18 |  | 40 | 60 | 740 | X |
| 19 |  | 45 | 65 | 631 | X |
| 20 |  | 50 | 70 | 544 | X |
| 21 |  | 55 | 75 | 474 | ◯ |
| 22 |  | 60 | 80 | 416 | ◯ |
| 23 |  | 65 | 85 | 370 | ⊚ |
| 24 |  | 70 | 90 | 329 | ⊚ |
| 25 | 3.4 | 55 | 75 | 495 | X |
| 26 | 3.5 | 55 | 75 | 506 | X |

X: breakage of electrode wires 102 within target time (equivalent to 300,000 km)
◯: breakage of electrode wires 102 after lapse of one or two times the target time
⊚: no breakage of electrode wires 102 even after elapse of two times the target time or more.

Figure 4:
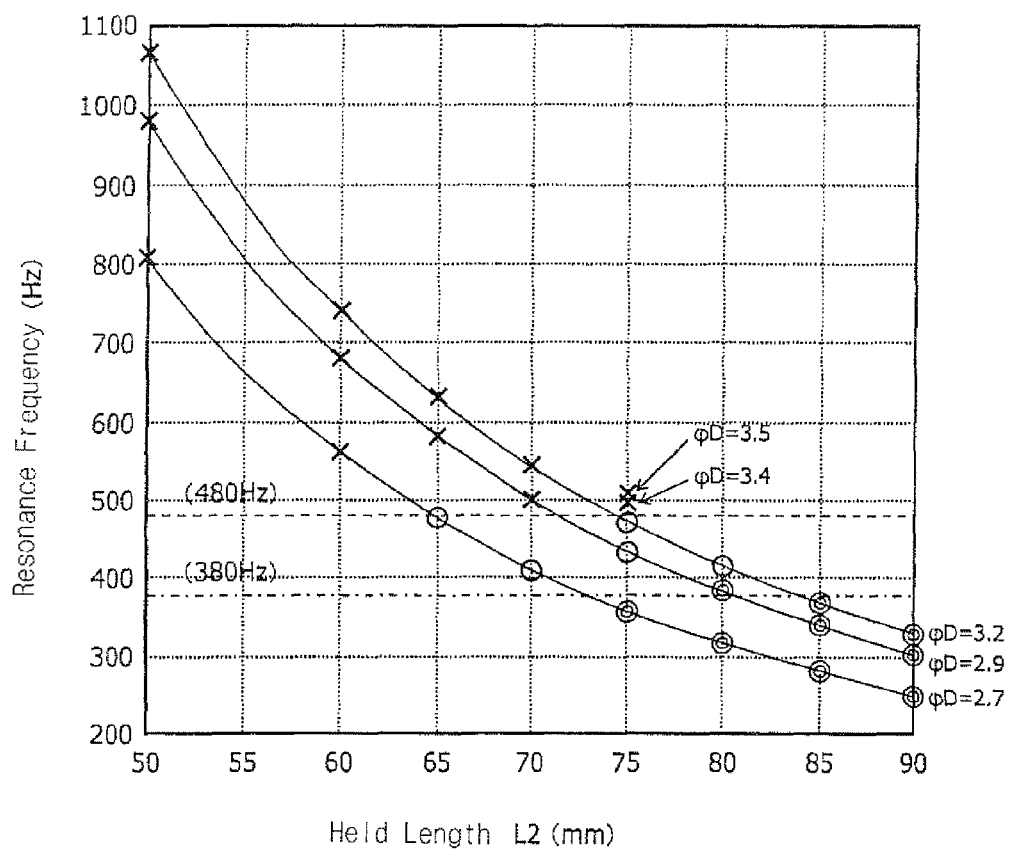
FIG. 4 is a graph which represents results of heat/resonance durability tests on an exhaust temperature sensor 1 of the invention.

FIG. 4 shows that the resonance (primary) frequency at the top end of the exhaust temperature sensor 1 drops with a decrease in the sensor outer diameter D and an increase in the held length L2.

FIG. 4 and Table 1 show that samples Nos. 3-8, 13-16, and 21-24 in which the resonance frequency is 480 Hz or less have improved durability against the disconnection of the electrode wires 102 which exceeds one time of the target time and is shorter than two times of the target time.

Particularly, it is advisable that the sensor outer diameter D be 3.2 mm or less, and the held length L2 be 75 mm or more. This, as can be seen from FIG. 4, causes the resonance (primary) frequency to be 480 Hz or less.

It is also found that samples Nos. 25 and 26 in which the held length L2 is as long as 75 mm, but sensor outer diameter D is more than 3.2 mm exceed 480 Hz in the resonance frequency and do not satisfy the target time.

It is also found that samples Nos. 5-8, 14-16, 23, and 24 in which the resonance frequency is 380 Hz or less have improved durability against the disconnection of the electrode wires 102 which is two times longer than the target time or more.

When the sensor outer diameter D is 3.2 mm or less, and the held length L2 is 85 mm or more, the resonance (primary) frequency will be 380 Hz or less.

In the above described embodiment, the rib 201 and the sheath pin 105 are designed so that they placed in direct contact with each other and welded together at the contact therebetween, but however, they may be, as illustrated in FIGS. 5(a) and (b), secured together through an additional member.

For instance, the temperature sensitive portion cover 104 is so fixed as to cover a portion of the outer circumferential surface of the top end of the sheath pin 105, but the longer temperature sensitive portion cover 104, as illustrated in FIGS. 5(a) and 5(b), may alternatively be used to dispose the sheath pin 105 therewithin. Specifically, the temperature sensitive portion cover 104 is welded at the base end side thereof to the base end side of the rib 201 to achieve the same effects as in the above embodiment. The fixing member 106 may be disposed between the inner circumferential surface of the temperature sensitive portion cover 104 and the outer circumferential surface of the sheath pin 105.

Figure 5:
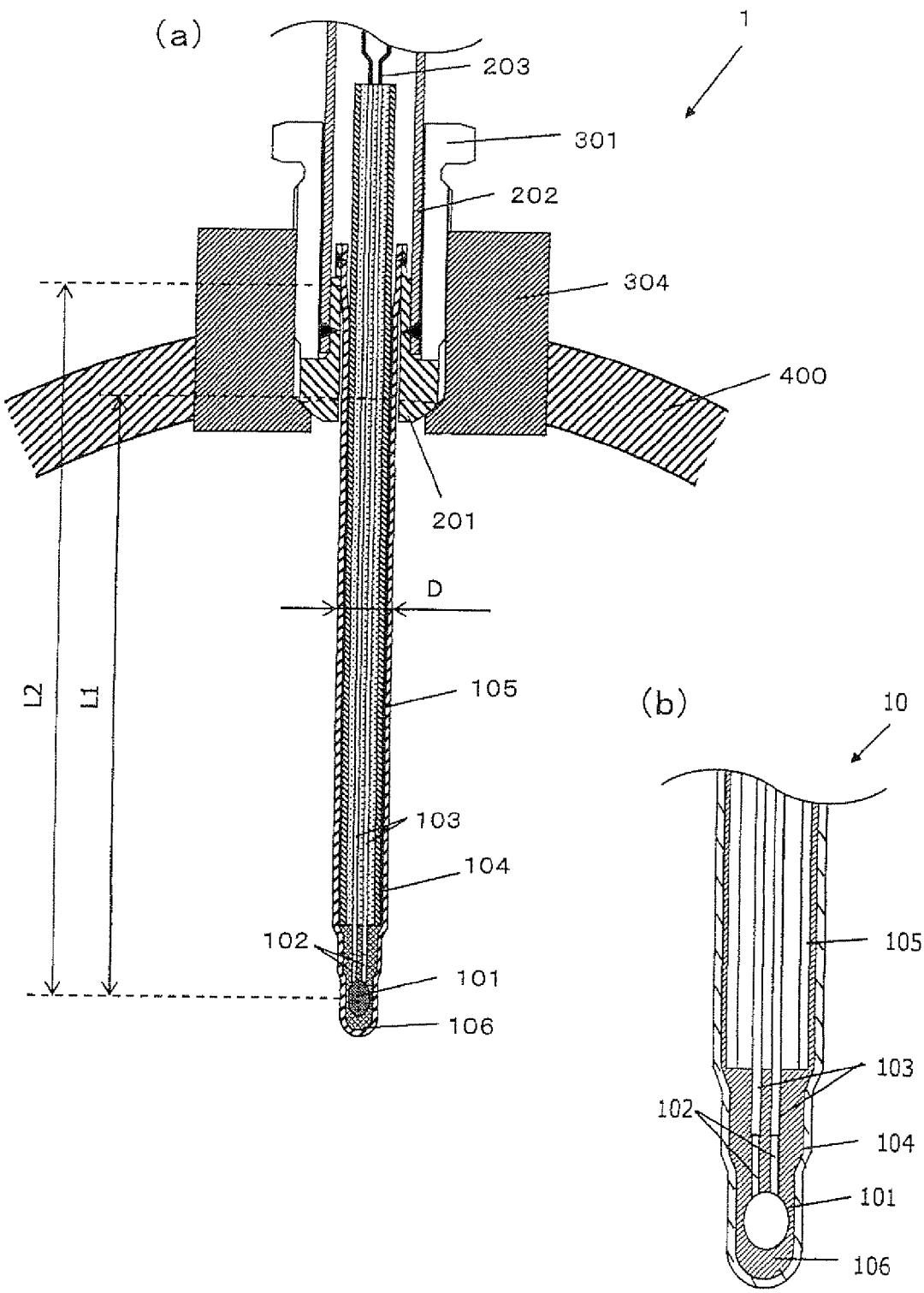
FIG. 5 is an enlarged sectional view which shows a temperature sensitive portion 10 in FIG. 4.

In the structure of FIG. 5, the outer diameter of a portion of the temperature sensitive portion cover 104 except a relatively smaller diameter portion thereof. The distance between the top end of the contact between the inner circumferential surface of the rib 201 and the outer circumferential surface of the temperature sensitive portion cover 104 and the top end of the temperature sensitive portion cover 10 is defined as L2. It is also important that L1<L2 is satisfied.

Figure 6:
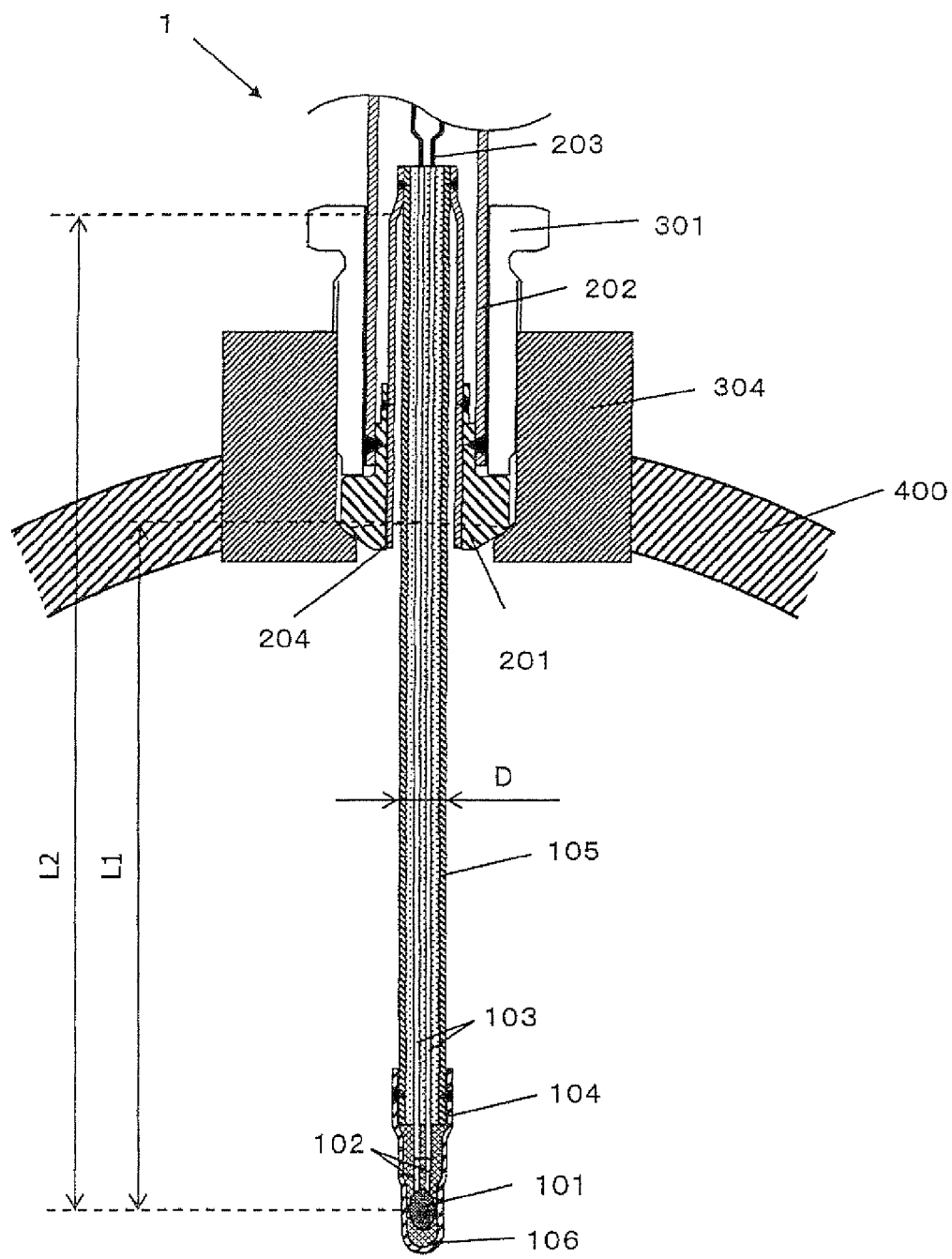
FIG. 6 is a cross sectional view which shows another embodiment of an exhaust temperature sensor 1 of the invention.

The protection tube 204 may be, as illustrated in FIG. 6, disposed between the inner circumferential surface of the rib 201 and the outer circumferential surface of the sheath pin 105. Additionally, although not illustrated, the top end of the protection tube 204 may be decreased in diameter because it results in interference with the sheath pin 105 to reduce the resonance of the sheath pin 105. In this case, the protection tube 204 may be placed in direct contact with the sheath pin 105, but such contact only serves to suppress the resonance and never as a fixed end of vibration of the sheath pin 105.

Figure 7:
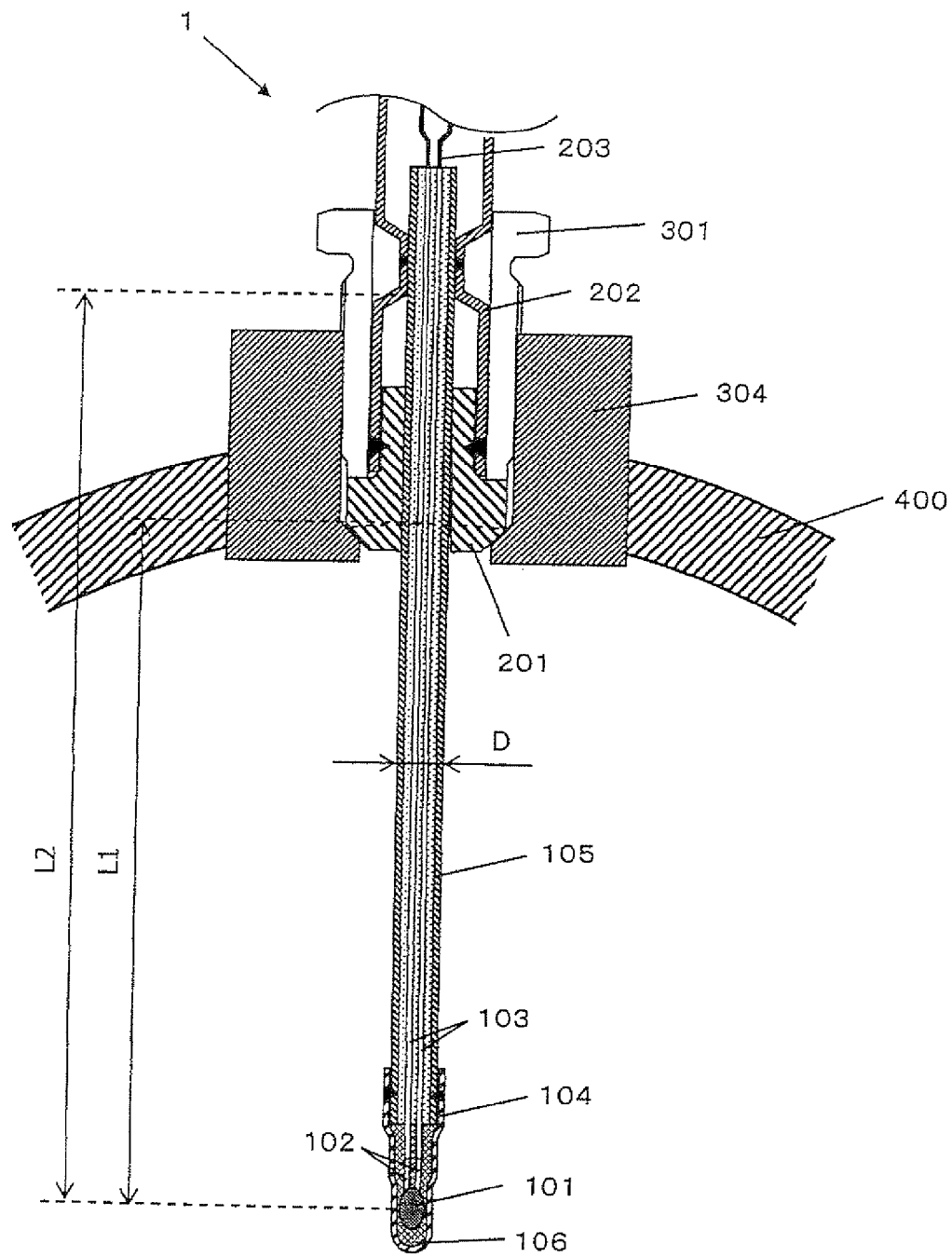
FIG. 7 is a cross sectional view which shows another embodiment of an exhaust temperature sensor 1 of the invention.

The protection tube 202 may also be, as illustrated in FIG. 7, crimped at the outer periphery thereof to decrease the diameter so as to make a contact with the sheath pin 105 located inside. The retaining of the sheath pin 105 may be achieved by welding the contact.

Figure 8:
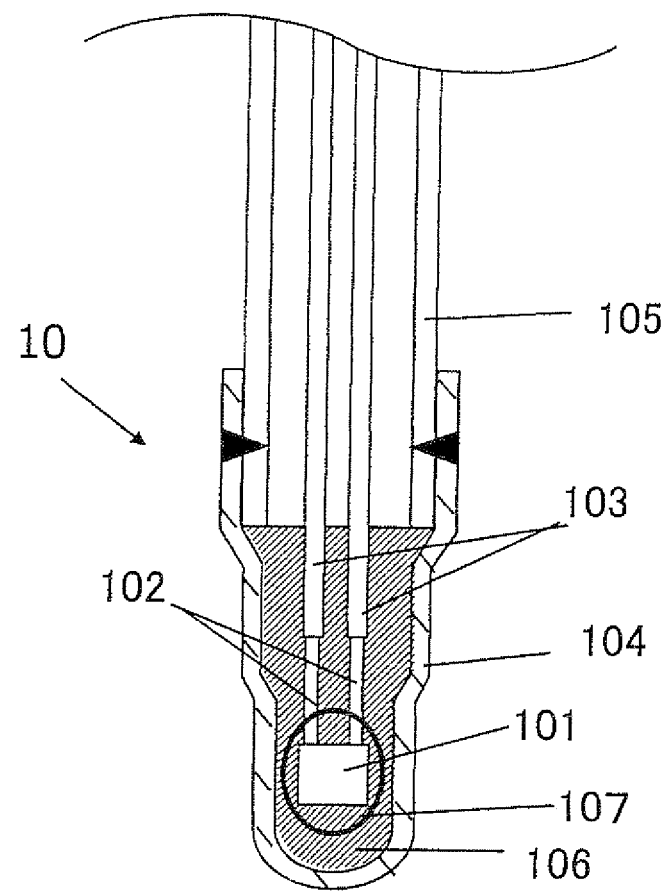
FIG. 8 is a cross sectional view which shows another embodiment of a temperature sensitive portion 10 of an exhaust temperature sensor 1 of the invention.
Figure 9:
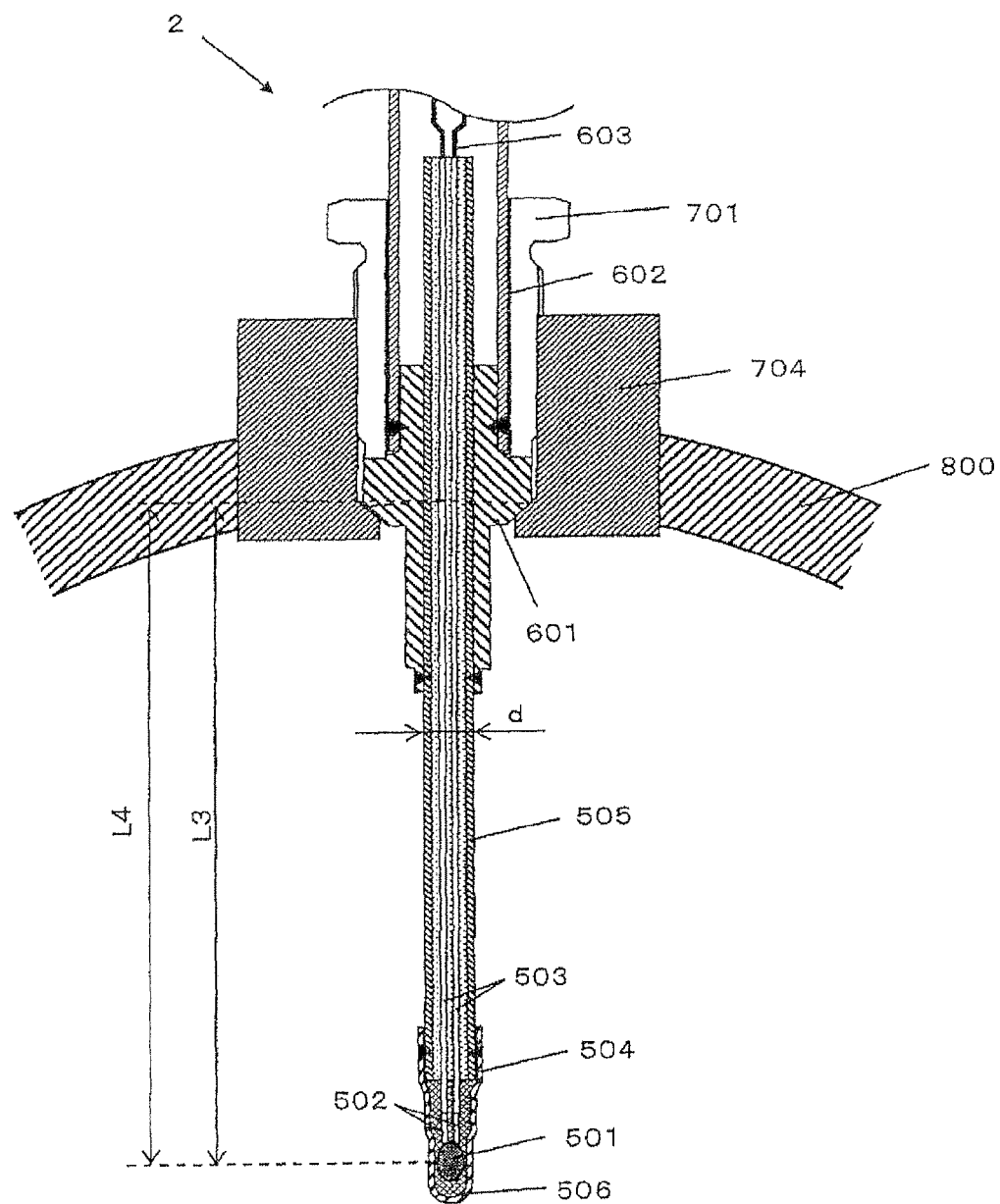
FIG. 9 is a cross sectional view which shows a conventional exhaust temperature sensor 2 installed in a flow path.

The glass material 107 which has the heat resistance may also be, as illustrated in FIG. 8, disposed to cover the thermister 101 to block the thermister 101 from the atmosphere in the temperature sensitive portion cover 104. This avoids the reduction-caused deterioration of the thermister 101 arising from oxidation of the temperature sensitive portion cover 104.

The structures may be modified in various ways without departing from the principle of the invention.

What is claimed is:

1. A temperature sensor comprising:
   a temperature sensitive device disposed in a flow path through which fluid flows and whose electric characteristic changes as a function of temperature of the fluid in the flow path,
   signal lines connected at top end sides thereof to said temperature sensitive device through electrode wires and at base end sides thereof to lead wires for connection with an external circuit,
   a sheath member retaining the signal lines therein, and
   a holding member which holds an outer circumferential surface of said sheath member directly or indirectly through another member,
   wherein a primary resonance frequency at a top end of the temperature sensor against acceleration in a radius direction of the temperature sensor is 480Hz or less.

2. A temperature sensor as set forth in claim 1, wherein said resonance frequency is 380Hz or less.

3. A temperature sensor as set forth in claim 1, wherein if a protruding length that is a distance between an inner circumference of said flow path and a top end of the temperature sensor on an axis of the temperature sensor is defined as L1 and a held length that is a distance between a top end of a portion of said sheath member which is held by the holding member directly or indirectly and the top end of the temperature sensor is defined as L2, a relation of L1<L2 is satisfied.

4. A temperature sensor as set forth in claim 1, wherein a diameter of a portion of the protruding length L1 which holds said temperature sensitive device is defined as a sensor outer diameter D, the sensor outer diameter D is 3.2mm or less, and the held length L2 is 75mm or more.

5. A temperature sensor as set forth in claim 1, wherein said temperature sensitive device is disposed inside a metallic cover.

6. A temperature sensor as set forth in claim 1, wherein said temperature sensitive device is a thermistor.

7. A temperature sensor as set forth in claim 1, wherein said temperature sensitive device is embedded in a fixing member supplied inside a top end of said metallic cover.

8. A temperature sensor as set forth in claim 1, wherein said temperature sensitive device is sealed by glass.

9. A temperature sensor as set forth in claim 1, wherein:
   a protruding length L1 that is a distance between a inner circumference of said flow path and a top end of the temperature sensor on an axis of the temperature sensor and
   a held length L2 that is a distance between a top end of a held portion of said sheath member which is held by the holding member directly or indirectly and the top end of the temperature sensor
   are dimensioned such that the primary resonance frequency of the top end of the temperature sensor is 480Hz or less as measured using a laser Doppler oscillometer.

* * * * *